(12) United States Patent
Keane (10) Patent No.: US 6,908,653 B2
(45) Date of Patent: Jun. 21, 2005

(54) ADVERTISING SYSTEM

(76) Inventor: Margaret A. Keane, 3750 W. Calhoun Pkwy., Minneapolis, MN (US) 55410

( * ) Notice: Subject to any disclaimer, the term of this patent is extended or adjusted under 35 U.S.C. 154(b) by 0 days.

(21) Appl. No.: 10/419,680

(22) Filed: Apr. 21, 2003

(65) Prior Publication Data
US 2004/0071915 A1 Apr. 15, 2004

Related U.S. Application Data (63) Continuation-in-part of application No. 10/120,068, filed on Apr. 10, 2002, now abandoned.

(51) Int. Cl.$^7$ .................................................. G09F 7/00
(52) U.S. Cl. ..................... 428/40.1; 40/453; 40/584; 40/594; 428/42.1; 428/42.2; 428/42.3; 428/192; 428/900; 428/914
(58) Field of Search ................................ 428/40.1, 42.1, 428/42.2, 42.3, 192, 900, 914; 40/584, 594, 453

(56) References Cited

U.S. PATENT DOCUMENTS

| | | | |
|---|---|---|---|
| 5,936,627 A | 8/1999 | Brown | 345/419 |
| 6,041,533 A | 3/2000 | Lemmond, Jr. | 40/584 |
| 6,118,595 A | 9/2000 | Miller | 359/725 |
| 6,159,569 A | 12/2000 | Hansen | 428/401 |

*Primary Examiner*—Nasser Ahmad
(74) *Attorney, Agent, or Firm*—Schwegman, Lundberg, Woessner & Kluth, P.A.

(57) ABSTRACT

A system for making at least one visual advertisement using at least one stepped surface, comprising: an array of decals displaying one or more visual advertisements on a stepped surface; a plurality of signage substrates wherein the decals are applied to the signage substrates, and; at least one guide mechanism adhered to the stepped surface, wherein each of the signage substrates is positioned by the guide mechanism.

15 Claims, 7 Drawing Sheets

ADVERTISING SYSTEM

RELATED APPLICATIONS

This application is a continuation-in-part of U.S. patent application Ser. No. 10/120,068, filed Apr. 10, 2002 now abandoned, entitled: ADVERTISING SYSTEM.

BACKGROUND OF THE INVENTION

The present invention relates to at least one visual advertisement using at least one stepped surface. The present invention also includes at least one removable decal displaying advertising indicia and an incremental surface wherein the decal is removably adhered to the incremental surface. The present invention further includes a method for making an advertisement.

Over the years, advertisers have exploited much of the space that is available in entertainment venues such as sports stadiums. For instance, score keeping devices have been a favorite medium for advertisers. Initially, when score keeping devices were largely mechanical, advertisers employed signage, positioned on the score keeping devices, to disseminate messages. The signage included lights having different colors for relaying score information and an arrangement that conveyed a message such as an advertisement. The signage also included billboards attached to the time keeping device. When the score keeping devices became electronic, the advertiser's messages also became electronic.

Advertisers expanded the scope of media employed for disseminating messages to walls, fences, players' uniforms, and the floors of stadiums. In one prior art embodiment in Calgary Canada's McMahon Stadium, steps inside of the stadium, adjacent to seats, were used to position signage. The signage devices in McMahon Stadium included a metallic material, such as stainless steel, and indicia made by paint, which bonded to the steel. The signage was substantially permanently attached to the steps by bolt type fasteners. The fasteners required users to drill holes into the steps for receiving the bolts. A company called Stair Media, Inc. has manufactured this prior art product. The signage devices were attached in a vertical position.

In some public venues, large numbers of decals have been applied to one or more type of surface. U.S. Pat. No. 6,159,569, describes a decal organization tool for products that require a large number of decals. The device uses a single large sheet that carries all product decals. An irregular zone is added to the edge of each decal, and along with an ultraviolet responsive additive which is placed on the decal.

SUMMARY OF THE INVENTION

One embodiment of the present invention includes a system for making at least one visual advertisement using at least one stepped surface. The system includes an array of decals displaying one or more visual advertisement on a stepped surface; a plurality of signage substrates wherein the decals are applied to the signage substrates, and; at least one guide mechanism adhered to the stepped surface, wherein each of the signage substrates is positioned by the guide mechanism.

Another embodiment of the present invention includes an advertisement comprising a signage substrate; at least one removable decal displaying advertising indicia that is removably attached to the signage substrate; a signage substrate holder wherein the signage substrate is removably retained; and an incremental surface to which the signage substrate holder is removably adhered to the incremental surface.

One other embodiment of the present invention includes a method for making an advertisement that is viewable when looking at one or more arrays of stair steps. The method includes providing a layout illustrating a predetermined image that is viewable when looking at one or more arrays of stair steps, comprising increments of the image on each step of the array; tagging each step of the array of steps; providing an array of decals, each decal comprising an increment of the image for one step; tagging each of the decals with a designation of the step to which the tag is to be applied; applying holders to each step; ordering the tagged decals on a plurality of substrates so that when the substrates with decals are sequentially removed and sequentially added to designated steps, the predetermined image is formed; and using the holders to hold each of the substrates.

DESCRIPTION OF THE DRAWINGS

FIG. 10A is a top plan view of another sign holder embodiment of the present invention.

DETAILED DESCRIPTION

Figure 1:
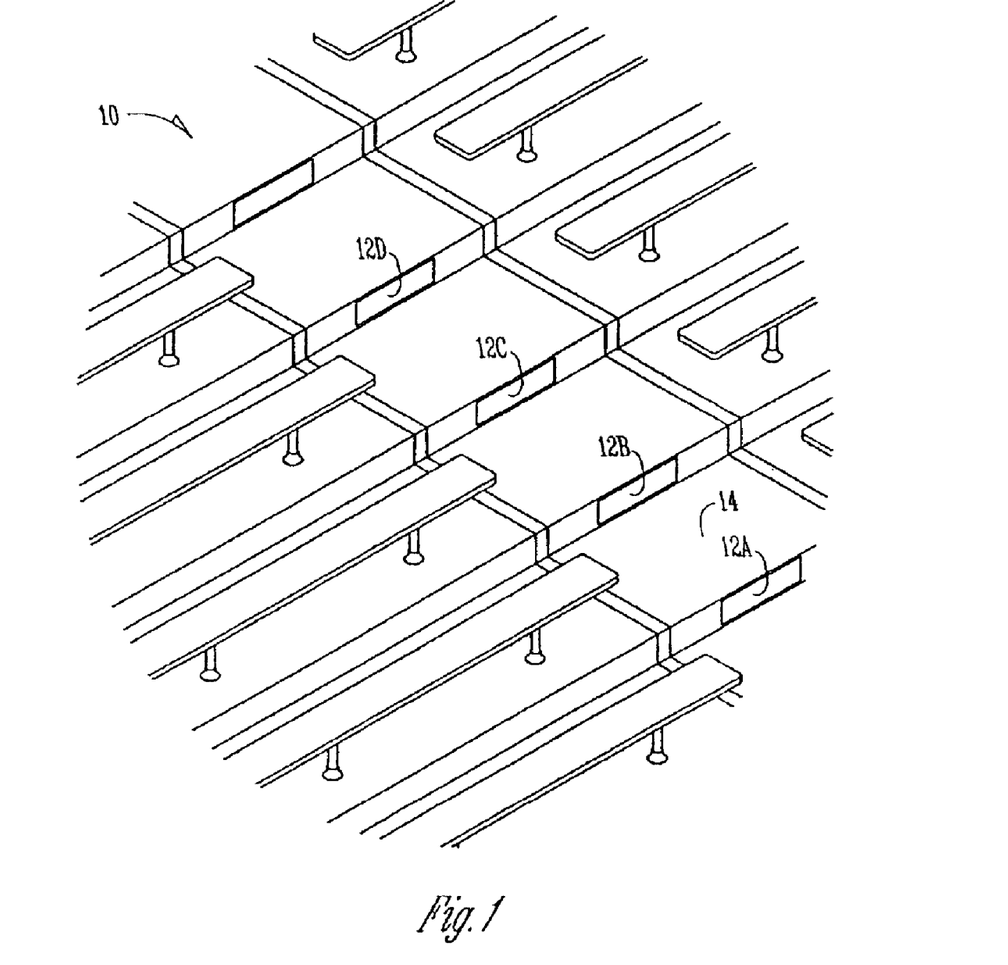
FIG. 1 is a perspective view of one embodiment of the array of signage of the present invention, applied to steps in a stairway.

One embodiment of the present invention, illustrated generally at 10 in FIG. 1, includes an array of signage 12A, 12B, 12C, and 12D that is adhered to a stairway 14. Each member of the array of signage, illustrated in cross-section at 16 in FIG. 2, includes a facestock 18 and an adhesive 20, which is adhered to the facestock 18 and a liner 23 that overlays the adhesive 20. The members 12A, 12B, 12C, and 12D shown in FIG. 1 have a generally rectangular shape. Members in other embodiments have symmetries that range from square to circular to asymmetrical. The array of signage 12A, 12B, 12C and 12D are shown in FIG. 1 as having substantially the same symmetry. For other embodiments, each member of the array has a different symmetry or groups of members of the array have different symmetries.

While the facestock is applied to stairs in FIG. 1, it is understood that the facestock is attachable to other articles such as chair backs, chair fronts, chair seat tops and chair seat bottoms, escalators, baggage claim carousels, airplane tray tables and so forth. The facestock for these embodiments also have symmetries that range from square to circular to asymmetrical.

Figure 2:
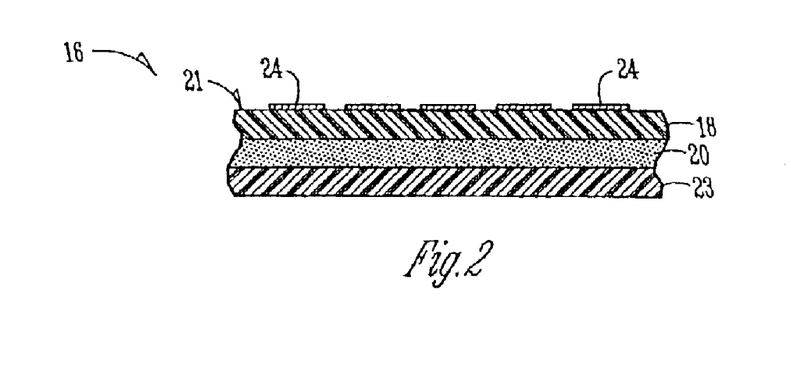
FIG. 2 is a cross-sectional view of one embodiment of one signage member of the array of the present invention.

Each facestock member of the array is a calendered, extruded polyvinyl chloride (PVC) film. In one embodiment, the film has a thickness of about 3.2 mils and is white or yellow. A thickness greater than 3.2 mils or less than 3.2 mils is suitable for some embodiments of the present invention. The adhesive 20 that is positioned on the facestock 18 is a pressure sensitive acrylic. The acrylic is water-based and is removable. A release liner 23 is positioned over the adhesive 20. The adhesive has a low peel and does not build significantly after the first 24 hours. The adhesive has a clean removability within one year on most surfaces. The average removability is at least about 3 years.

The adhesive 20 has displayed the following adhesion values, in grams/inch. Tests were performed in accordance with PSTC Method 1, for Stainless Steel:

| Contact Time 30 min. | 24 hr. | 1 yr. | 3 yrs.* |
|---|---|---|---|
| 545 | 636 | 681 | 681 |

The adhesive is resistant to most oils, greases and aliphatic solvents. The adhesive has a shrinkage of about 0.5%. While an acrylic-based adhesive is described, it is believed that other types of adhesives, such as an epoxy adhesive are suitable for use for other particular embodiments.

An outer surface 21 of the facestock has indicia 24. The indicia are made with ultraviolet, cured pigmented inks. Other types of inks and coloring agents are usable, depending upon the specific application. The members of the array have an outdoor durability of at least about three years and have an average durability of about five years.

It has surprisingly been found that a PVC facestock adhered to a step with a water-based acrylic pressure sensitive adhesive has a durability of at least about five years. The facestock may be adhered to a vertical surface of a step or to a horizontal surface of a step. That the durability is at least about five years is surprising in light of a prior art product that employed stainless steel as the facestock and that employed mechanical devices that were actually bored into a step. The array of members of the present invention displays substantially the same durability, once applied to a step, indoors or outdoors, as the prior art product. However, unlike the prior art product, the members of the array of the present invention are attached to steps without defacing the steps by boring holes in the steps.

Furthermore, the members of the array of the present invention are applicable to steps and are removable from steps with substantially less manpower than is required for the prior art product. Thus, the signage is changeable at a greater frequency and at a lower cost than the prior art signage.

The prior art method for applying a stainless steel signage sheet to a step requires additional fasteners, such as bolts or pins and additional devices for installation, such as hammers, devices for boring holes into step material, such as concrete, and a carrier device for moving the stainless steel signage sheets from one step to another. The stainless steel sheets impart significant weight to the array of sheets and render conveyance of the sheets cumbersome and difficult.

Figure 3:
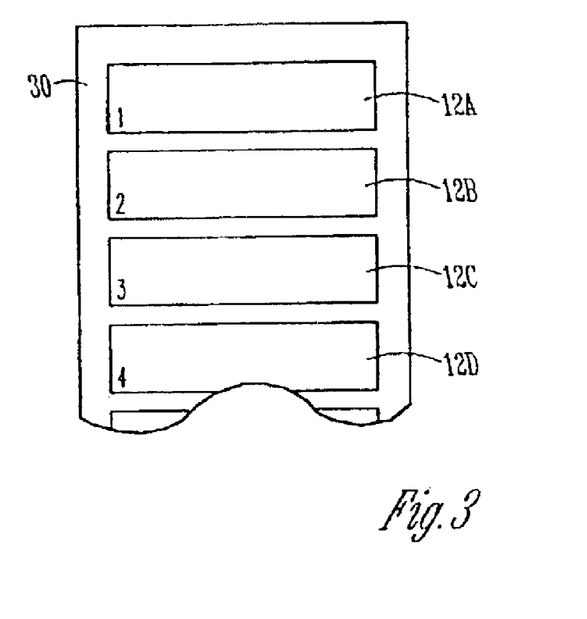
FIG. 3 is a top plan view of one embodiment of the array of signage of FIG. 1 on a support sheet.
Figure 4:
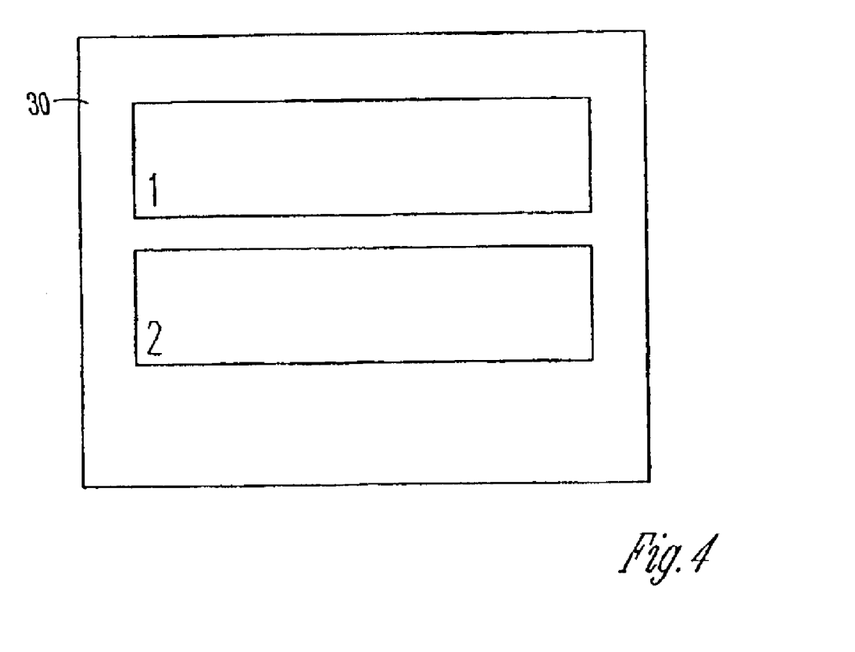
FIG. 4 is a top plan view of one embodiment of the array of signage of FIG. 1 on another support sheet embodiment.
Figure 6:
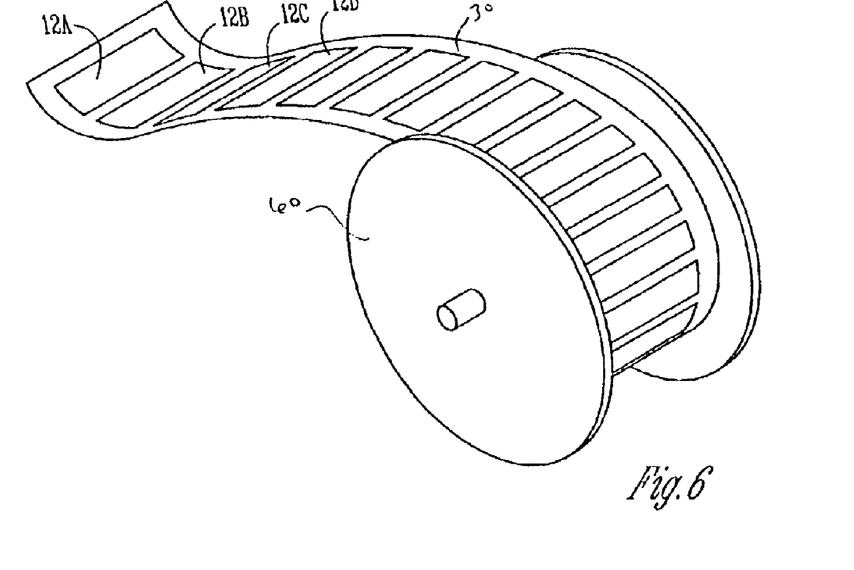
FIG. 6 is a side view of one embodiment of the array of signage, sequentially arranged on a support sheet which is rolled on a spool.

The method of the present invention includes a method for applying an array of signage to steps. The signage includes PVC film signage components 12A, 12B, 12C, and 12D, that are attached to a support sheet 30, as shown in FIG. 3. The signage components are releasably attached through the release portion 22. In one embodiment, signage members 12A . . . 12N are positioned as a single column on a support sheet that is rollable on a spindle as shown in FIG. 6. For some embodiments, several signage members form a repeatable pattern when applied on the steps. These members are arranged on the support sheet 30 in the same order in which they are applied to the steps. Indeed, the signage members are, in some embodiments, printed in the order in which they are applied to the steps.

The signage members 12A, 12B, 12C . . . 12N, are adhered to the steps by first, pulling the members from the sheet 30 and then applying the members to each of the steps to be marked. The members are alignable with each other and with the dimensions of the step using any conventional alignment device. The members are applied so that the adhesive contacts the surface of the step. As described, the members are retained on the step by adhesive for an average period of time of about three years.

The members are removable from the step without damaging the step or otherwise disfiguring the step. In one embodiment, the members are scraped from the steps.

Figure 9:
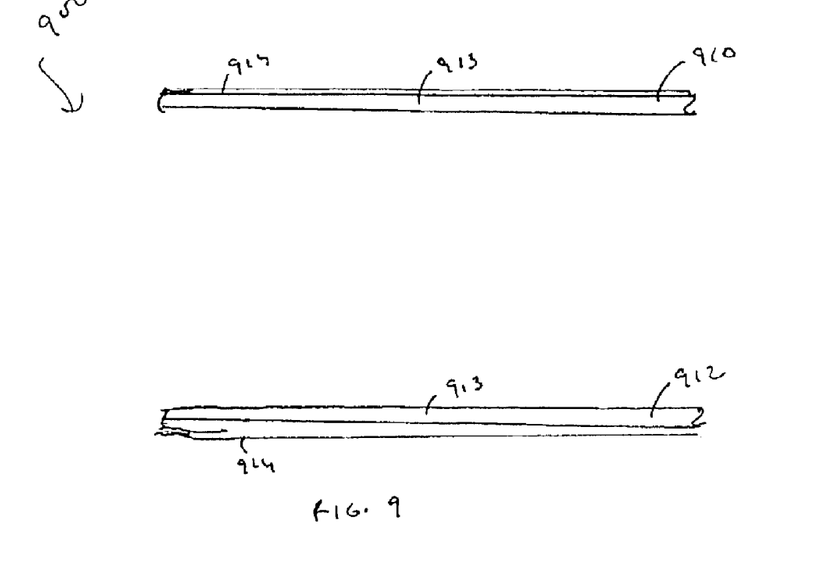
FIG. 9 is a perspective view of one embodiment of a sign holder of the present invention.

Another embodiment of the present invention includes a sign holder that is adhesively applied to a vertical surface, such as a step surface, one embodiment of which is shown at 900 in FIG. 9. The sign holder includes a first bracket 910 and a second bracket 912. The brackets 910 and 912 define tracks 913 for receiving a signage substrate 904. The brackets also include a sidewall 914 to which an adhesive is attached. The adhesive adheres the brackets 910 and 912 to a surface such as a step. In another embodiment, illustrated in FIG. 10, the brackets 910 and 912 are connected by a spacer 916. The spacer 916 also includes a sidewall 918 to which adhesive is attached. The adhesive adheres the spacer 916 to a surface such as a step. The spacer 916 has a length that separates the brackets 910 and 912 to an extent that permits the brackets to receive the signage. In one other sign holder embodiment, illustrated at 950 in FIG. 10A, the sign holder includes an additional spacer 920, to make a frame. The sign holder 920 is sized to receive a signage substrate. The sign holder embodiments of the present invention are sized to receive signs of preselected dimensions.

Figure 10:
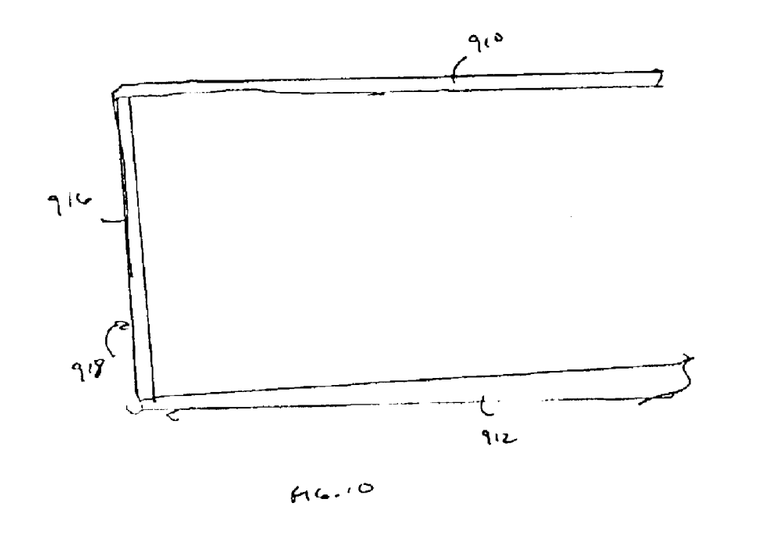
FIG. 10 is a top plan view of a sign holder that includes sliders and a spacer.
Figure 10B:
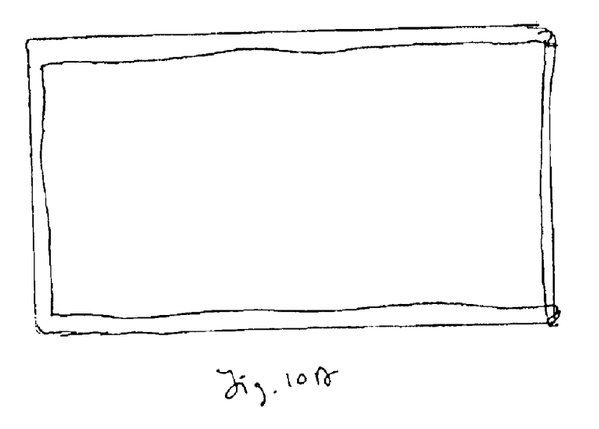

The signage substrate 904 includes ends that are, in one embodiment, beveled for receipt into the tracks of the brackets 910 and 912. In one embodiment, movement of the signage substrate is stopped by the spacer 916. In one embodiment, the decals described herein are adhered to the signage substrate 904. The signage substrate 904 is then positioned within the brackets 910 and 912. When it is desired to change the signage, the signage substrate is removed from the brackets by sliding it out of the brackets 910 and 912. The decal is removed from the surface and is, for some embodiments, replaced with a new decal. The surface of the signage substrate 904 is optionally treated in order to remove the decal more quickly.

The brackets and spacer are made of materials that include metals and polymeric materials. The signage substrate 904 is made of a material resistant to corrosion, such as a polymeric material.

One other embodiment of the present invention includes magnets that are adhered to a surface such as a step. Magnets are also positioned on signage substrates in positions that match the magnets on the surface of the step.

Figure 7:
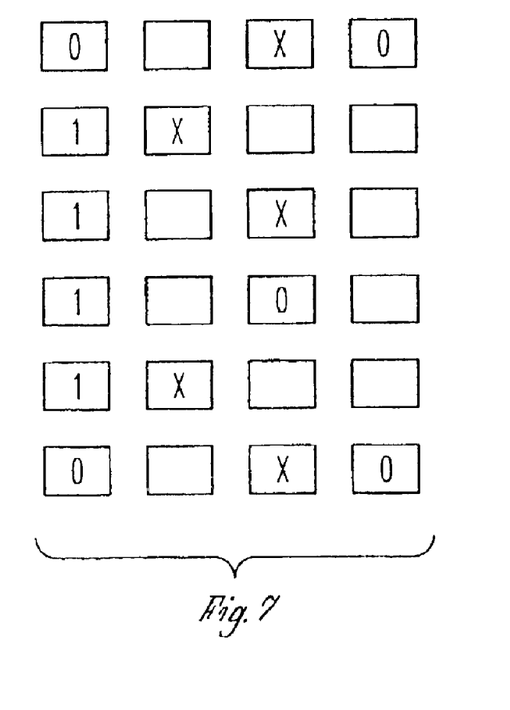
FIG. 7 is a top plan view of one image divided into increments corresponding to application locations.

Another embodiment of the present invention includes a system for making a pre-programmed display that includes an array of signage ordered in preprogrammed positions in order to display one or more images. The pre-programmed display is, for some embodiments, a visual advertisement. The term "visual advertisement" as used herein refers to a message that is conveyed in a medium that can be viewed. The message is, for some embodiments, embodied within the step sign. For other embodiments, a desired image is generated and is divided into increments, "1". "X", and "0", such as is shown in FIG. 7. Each increment is printed onto a step sign.

In one embodiment, the image is made by using each step sign as a portion of a larger indicia. The term "step sign" as used herein, refers to a decal positioned on the vertical face of a step. Each sign has a background coloring that is one component of a larger image. Each of the signs also has its own message. The message may be unique to the sign or may be a message that is repeated on multiple step signs. This method also includes identifying each step employed and imparting an identification code, such as an identification number to each step. Once the desired image or images are computer-generated, the coloration of each step sign is defined. The image of each step sign is given an identification that corresponds to the identification of the step. The identification is embodied in a step tag or identification code and a decal tag or identification code. The step is, for some embodiments marked with the tag or identification code. For other embodiments, the step is tagged in a map of all of the steps used to make the image. The decal tag is, for some embodiments, placed on the decal. For other embodiments, the tag is placed on a substrate upon which the decal is adhered and ordered.

Thus, one embodiment of the present invention includes an image that includes incremental portions. Each portion is tagged with a location identifier. The image is applied to a surface that has elevation, such as one or more staircases. The vertical portion of each stair step within the stairway is tagged so that the incremental portions of the image are mapped to the vertical portion of each stair step. The incremental portions of the image are separately printed and sequentially applied to an elongated substrate that can be rolled onto a spool. In another embodiment, the incremental portions are separately printed and sequentially applied to a substrate that is cut and stacked.

The step signs are produced with the desired message and the desired coloration using a process such as laser printing, in which computer-generated images are laser printed on the PVC facestock. Additionally, an identification code or tag is printed on the facestock. The identification code corresponds to the identification code or tag of the step to which the facestock is adhered.

For some embodiments the step signs are equipped with lighting mechanisms, in some instances, for lighting indicia on the signs. The lights are, in some embodiments, bulbs that are powered by an energy source such as a battery positioned on a rear face of the sign or adjacent to the sign. For other embodiments, the lighting is created by fiber optics. For other embodiments, the lights are LED's or strobe lights or a combination of any or all of these light options. The LED, strobe light, and light bulb are attachable to the sign using an adhesive tape that adheres the LED or other light source to the surface of the sign.

The lights are either multi-colored or mono-colored. The lights, in some embodiments blink. The blinking is patterned or random. In one embodiment, the light circuit includes a photoelectric cell on the step. When an individual steps on the step, changing the light to the photoelectric cell, the change in light intensity causes the light to blink.

Figure 8:
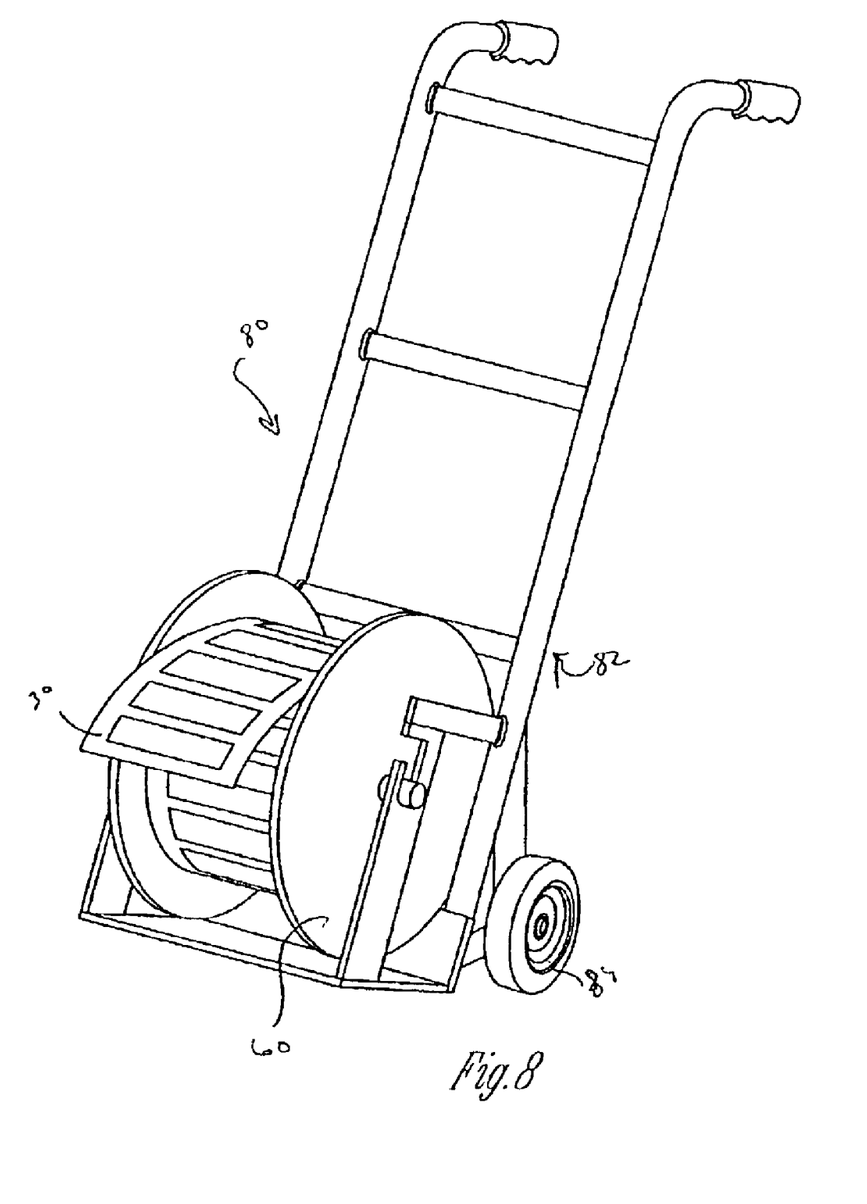
FIG. 8 is a perspective view of one embodiment of a device for moving the spool of the device of FIG. 6.

The step signs are applied to the substrate in an order in which they are to be applied to steps. The substrate is rolled on a spindle as shown at 60 in FIG. 6. The spindle 60 is positioned on a moving device, as is shown at 80 in FIG. 8 that permits a user to move the rolled substrate from one location to another. In one embodiment, the moving device, illustrated in FIG. 8, includes a frame 82 for receiving the spindle 60 and at least two wheels 84 and a second wheel which is not shown, for moving the frame 82 and rolled substrate. For other embodiments, where the substrate with signs include sheets rather than a continuous roll, the sheets are placed in a wagon or other device that permits a user to move the sheets while retaining the sheets in a predetermined order.

Thus, the application of signs to steps in order to create very complex imaging may be accomplished using procedures that can be performed and equipment that can be operated by individuals who are not highly skilled. Individuals applying the signs to steps are provided with a map of the stadium wherein each step has an identification. For some embodiments, the steps themselves are marked with a unique identification tag. The individuals applying signs to steps match the identification code on the sign to the identification code on the step. Once the individuals have verified the match, the individuals apply the sign to the step.

The systems and methods of the present invention are usable to make a predetermined image that conveys an advertisement with a single message. The advertisement includes an array of image increments. Each increment is part of the predetermined image. Each increment is positioned on an incremental surface such as the vertical portion of a stair step.

Figure 5:
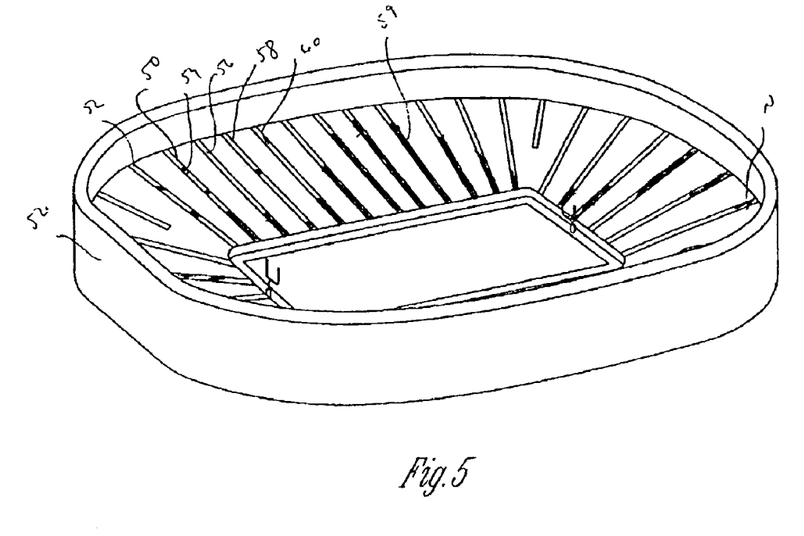
FIG. 5 is a top plan view of one embodiment of the array of signage of FIG. 1 which are applied to stairs within a stadium.

In other embodiments, the predetermined image includes two or more messages. The predetermined image includes one message encompassed by the entire image and one or more messages in each of the increments that make-up the predetermined image. For some embodiments, the predetermined image includes two or more messages that are both in the entire image. Each of the messages is individually viewable from a particular vantage area. In one embodiment, illustrated at 50 in FIG. 5, a stadium 52 is shown with staircases 52, 54, 56, 58, . . . N. A design 59 is viewable from above the stadium. Another message or design is viewable to individuals actually sitting in the stadium, looking at the signs on the steps.

Another embodiment of the present invention includes a use of vertex tracking to generate an electronic image from an image generated in a physical medium using inks, paints and other indicia-generating media. The electronic image is for some embodiments, two-dimensional and for other embodiments, three-dimensional. The electronic image is for some embodiments, static and for other embodiments, moving or changing or moving and changing.

The electronic image is generated within a computer system. A three-dimensional, 3-D, graphical object is displayed on a screen of a video display monitor. The three-dimensional object is built form a collection of vertices. Typically, each vertex is specified by three Cartesian coordinates, x, y, and z, in a 3-D graphical object data set. The collection of vertices is obtained from the image generated in a physical medium. Prior to electronic display, each vertex of the image generated in a physical medium undergoes a series of transformations. The first transformation, a modeling transformation, positioned a vertex relative to a computational origin shared by all objects in a 3-D scene. The second transformation, called the viewing transformation, positions a vertex relative to the location and orientation of a viewer in front of the screen. The third transformation, called the projection transformation, accounts for optical effects such as perspective foreshortening, by positioning a vertex relative to the portion of space visible to the viewer, referred to as the view volume. The net effects of these three transformations are combined into a single transformation, which is referred to as a vertex transformation.

Vertex transformation is performed in homogeneous coordinates in which each original vertex locations represented as a four-component vector [x,y,z,1]. This four-component vector is then multiplied by a 4×4 matrix, resulting in another four-component vector [x',y',z',w'] that represents a vertex location relative to the view volume. The coordinates of ths four-component vector are referred to as clip coordinates.

Subsequent to the vertex transformations, a clip test is performed, in which each transformed vertex is checked against the boundaries of the view volume for determining whether or not the graphical object is visible to the viewer. A transformed vertex is visible to the viewer only if prescribed conditions, defined by those skilled in the art, are defined. The results of these checks are combined to become an attribute for the vertex known as clip code. Each clip code is six-bits long, in which a "0" bit implies the corresponding inequality is satisfied while a "1" bit implies otherwise.

Each vertex that falls inside the view volume is then projected onto the screen by utilizing an operation call perspective divide. A perspective divide operation generates normalized device coordinates (NDCs) by converting a four-component clip coordinates [x',y',z',w'] into a three-component NDC [x'/w',y/w',z'/w']. In an NDC, x'/w'and y'/w' specify the horizontal and vertical location of the vertex on the screen while the z'/w' represents the relative distance of the vertex from the viewer and is utilized to properly display overlapping objects. This accomplishes a realistic perspective effect, the vertex transformation operates in such a manner that w' is small for points near the viewer and large for points far away from the viewer.

After the perspective divide operation, an RGBA (red, green, blue, alpha) color is further computed for each vertex based on standard lighting equations. The color is computed to simulate realistic lighting effects. The graphical object is displayed on the screen by an operation known as rasterization. This rasterization operation is frequently performed by a dedicated 3-D graphics hardware, but it can also be performed by software as well.

The vertex tracking embodiment is further described in U.S. Pat. No. 5,936,627. It is believed that other methods of vertex tracking are suitable for use in the present invention. With vertex tracking, physical indicia created in one embodiment of the present invention is mapped to create another electronic image. The electronic image may be mapped and created to be static or moving.

While the invention has been particularly shown and described with reference to specific embodiments, it will be understood by those skilled in the art that various changes form and detail may be made therein without departing from the spirit and scope of the present invention.

What is claimed is:

1. A system for making at least one visual advertisement using at least one stepped surface, comprising:

an array of decals displaying one or more visual advertisements on a stepped surface; a plurality of signage substrates wherein the decals are applied to the signage substrates, and; at least one guide mechanism adhered to the stepped surface, wherein each of the signage substrates is positioned by the guide mechanism;

a mechanism for ordering the decals so that each decal is associated with a particular step and each decal arranged sequentially on the signage substrates so that each decal is sequentially applied to the step with which it is associated wherein each step used to make the visual advertisement is given a tag and each signage substrate or each decal is given a tag that associates the step and the decal substrate.

2. The system of claim 1 wherein each of the decals comprise a poly vinyl chloride film having two faces wherein indicia are on one face and an adhesive is on an opposing face.

3. The system of claim 2 wherein the adhesive is a pressure sensitive acrylic.

4. The system of claim 2 wherein the adhesive is applied to the guide mechanism to adhere the guide mechanism to the step.

5. The system of claim 4 wherein the pressure sensitive acrylic is water-based and removable from a step surface.

6. The system of claim 3 wherein each of the decals has a thickness of about 3.2 mils.

7. The system of claim 3 wherein the adhesive is overlayed with a release layer.

8. The system of claim 3 wherein the decal adhesion has a durability of about 5 years.

9. The system of claim 1 wherein each decal includes indicia that conveys a single advertisement message.

10. The system of claim 1 wherein each decal includes indicia that conveys a portion of a single advertisement message.

11. The system of claim 1 wherein each decal includes indicia that conveys a portion of two or more advertisement messages.

12. An advertisement comprising a signage substrate; at least one removable decal displaying advertising indicia that is removably attached to the signage substrate; a signage substrate holder wherein the signage substrate is removably retained; and an incremental surface to which the signage substrate holder is removably adhered to the incremental surface; a mechanism for ordering the decals so that each decal is associated with a particular step and each decal is arranged sequentially on the signage substrates so that each decal is sequentially applied to the step with which it is associated wherein each step used to make the visual advertisement is given a tag and each signage substrate or each decal is given a tag that associates the step and the decal substrate.

13. The advertisement of claim 12 comprising two or more signage substrates having decals displaying advertising indicia and two or more incremental surfaces having signage substrate holders wherein the decals are positioned to display one or more advertising messages.

14. The advertisement of claim 12 wherein the signage holder includes a magnet.

15. The system of claim 1 wherein the sign substrate includes one or more light.

* * * * *

UNITED STATES PATENT AND TRADEMARK OFFICE
CERTIFICATE OF CORRECTION

PATENT NO. : 6,908,653 B2
DATED : June 21, 2005
INVENTOR(S) : Margaret A. Keane It is certified that error appears in the above-identified patent and that said Letters Patent is hereby corrected as shown below:

<u>Column 8,</u>
Line 6, after "decal" insert -- is --.
Line 44, insert -- and -- before "a".

Signed and Sealed this

Thirteenth Day of September, 2005

JON W. DUDAS
*Director of the United States Patent and Trademark Office*